United States Patent

König

[11] 4,146,752
[45] Mar. 27, 1979

[54] SEIZING CURRENT DELAY CIRCUIT FOR THE TEST SWITCHING MEANS OF A TELECOMMUNICATION SWITCHING SYSTEM

[75] Inventor: Justus König, Munich, Fed. Rep. of Germany

[73] Assignee: Siemens Aktiengesellschaft, Munich, Fed. Rep. of Germany

[21] Appl. No.: 863,246

[22] Filed: Dec. 22, 1977

Related U.S. Application Data

[63] Continuation of Ser. No. 668,522, Mar. 19, 1976, abandoned.

[30] Foreign Application Priority Data

Mar. 21, 1975 [DE] Fed. Rep. of Germany ....... 2512660

[51] Int. Cl.² .......................................... H04M 3/22
[52] U.S. Cl. ............................... 179/18 AB; 307/293
[58] Field of Search .................................. 179/18 AB

[56] References Cited

U.S. PATENT DOCUMENTS

| 4,041,245 | 8/1977 | Konig et al. | 179/18 AB |
| 4,049,922 | 9/1977 | Konig et al. | 179/18 AB |

*Primary Examiner*—William C. Cooper
*Attorney, Agent, or Firm*—Schuyler, Birch, Swindler, McKie & Beckett

[57] ABSTRACT

A switching arrangement for a telecommunication switching system having test and seizing circuits is disclosed in which test switching means for bounce-free contact operation require a seizing current rise delayed by switching means in the seizing circuit. The improvement comprises a transistor for establishing the seizing current, a testing resistor disposed in series with the transistor and an RC network associated with the transistor. The potential across a control electrode of the transistor which is determined by the charging voltage of said associated RC network defines a control current. The potential renders the transistor increasingly conductive to current in accordance with a charging process setting in at the start of a test and seizing operation.

7 Claims, 1 Drawing Figure

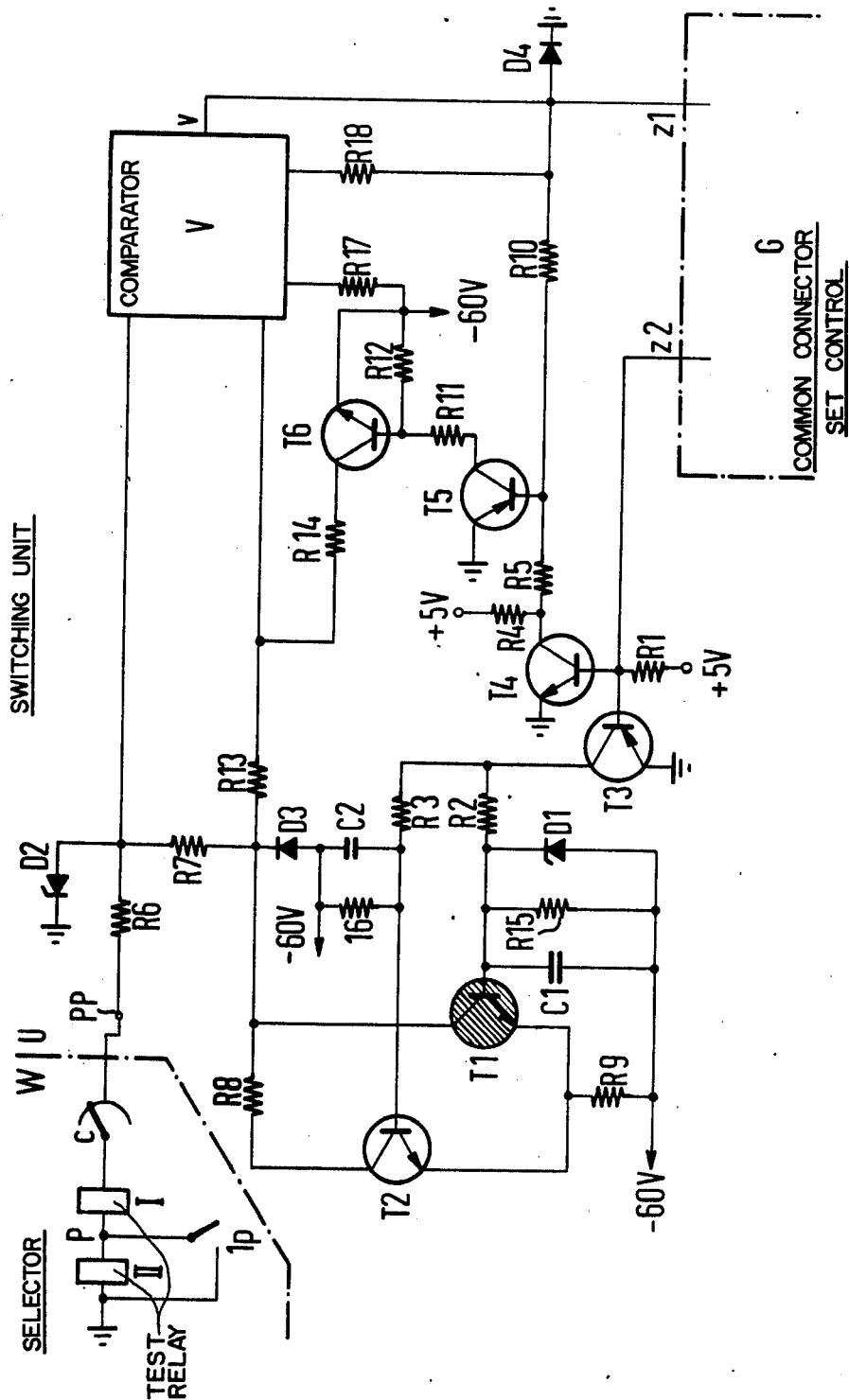

SEIZING CURRENT DELAY CIRCUIT FOR THE TEST SWITCHING MEANS OF A TELECOMMUNICATION SWITCHING SYSTEM

This is a continuation of application Ser. No. 668,522, filed 3-19-76 now abandoned.

BACKGROUND OF THE INVENTION

A switching arrangement for a telephone switching system having test and seizing circuits has been disclosed in West German Pat. No. 1 013 701. One of the functions of the test relay P shown therein is to sense an idle condition in one of the telephone lines and then to stop the selector motor. To do this, the test relay is so designed that it responds far more rapidly than other known electromechanical relays. The response circuit for this test relay P includes the seizing circuit of a rear-position switching component. In conventional switching arrangements, this seizing circuit comprises an electromechanical relay such as, for example, shown in West German Auslegeschrift No. 1 940 847. To achieve a minimum response time for the test relay, the seizing relays in the seizing circuit normally carry in the quiescent condition a secondary short-circuited winding, whereby, when the test and seizing circuit is closed, a relatively steeper current rise is achieved which results in a relatively short response time for the test relay.

In addition, the use of purely ohmic resistances as the testing resistance or impedance in the seizing circuit has likewise been disclosed in West German Pat. No. 1 173 538. The necessary switching functions in this seizing circuit are carried out by transistors.

Seizing circuits as disclosed in West German Pat. No. 1 173 538 exhibit an even steeper current rise upon turning on a test and seizing circuit than the seizing circuit described in West German Auslegeschrift 1 940 847. Although in the latter Auslegeschrift the seizing relay has a secondary winding which is short-circuited in the quiescent condition, the remaining inductance of the seizing relay still causes a certain delay in the current rise in the test and seizing circuit. Thus, although the response time of rapidly operating test relays can be further accelerated as described above, this creates the problem of contact bounce. This contact bounce occurs where, after a first closing, the test relay contacts open briefly one or more times before coming to rest. In the test relay contacts which stop the selector motor, this results in increased contact wear due to the particularly heavy current load across these contacts.

SUMMARY OF THE INVENTION

It is an object of the invention to slightly delay the current rise in seizing circuits and to realize this by means other than through the use of relay coils and the like in the seizing circuits.

In accordance with the invention, the foregoing and other objects are achieved by connecting a testing resistor in the seizing circuit in series with a transistor defining the seizing current; the potential across a control electrode of the transistor is determined by the charging voltage of an associated RC network. This charging voltage renders the transistor increasingly conductive of current in accordance with a charging process which is initiated at the start of a test and seizing process.

In accordance with the invention, the periodic current flow in test and seizing circuits is adapted to the requirements for test relays. In addition, in a very convenient manner, electronic switching means such as transistors replace the relay switching functions in conventional relay connector sets.

BRIEF DESCRIPTION OF THE DRAWING

The drawing shows the details of a practical embodiment of the invention that are only necessary for enhancing the understanding of the invention but do not in any way limit the scope of the invention.

DETAILED DESCRIPTION OF A PREFERRED EMBODIMENT

The test circuit of a selector W is shown with the two coils I and II of a test relay P. Coil II of the test relay may be short-circuited over an intrinsic relay contact 1p. The test circuit of selector W may be connected in a manner in itself known over a test switch arm c to check points PP of rear-position switching units U ready for seizure. These switching units U ready for seizure may be connector sets, e.g., internal connector sets, outside repeaters, line termination circuits of long-distance trunks and the like, or they may be among the switching facilities needed for each connection of the telephone switching system, that is, they may be individually allocated throughout the duration of a particular connection. For example, these switching units U may be selectors, interexchange trunks, links in switching networks, and the like.

A plurality of these switching units U which are ready for seizure are combined into one group which is allocated to a common-connector-set control G as disclosed in West German Pat. No. 2 055 745, now U.S. Pat. No. 3,924,081 ("buffer storages allocated to individual groups"). Each of the switching units U communicates with the common control G via both circuits z1 and z2. Each of the switching units U signals its circuit condition to the common control G via circuit z1. The common control G signals each of the switching units via circuit z2 with the switching instruction "connect to high impedance" or alternatively it may signal the switching units to "block" against renewed seizure if the particular switching unit U is in the idle condition and temporarily is not ready for seizure.

When the switching unit U is in the idle condition and is ready for seizure, a negative potential is applied across the base of transistor T3 from the common control G over the circuit z2. The negative potential applied from common control G is sufficient to make the 5-volt potential across the resistor R1 ineffective. In response to this negative potential over the circuit z2, transistor T3 conducts current. As a result, resistors R2 and R3 ground the bases of transistors T1 and T2. A comparatively weak quiescent current flows through the emitter-base junction of each transistor. Both transistors are thus prepared for the switching of the test and seizing circuit.

Transistor T4, when switching unit U is in the idle condition and is ready for seizure, is blocked by the negative potential applied from circuit z2 of the common control G. Transistor T5 is likewise blocked in this circuit condition by the 5-volt positive potential impressed on its base via resistors R4 and R5. Since an identical potential (−60v negative potential) is applied to the base and emitter of transistor T6 in the quiescent condition, this transistor, too, does not conduct current in the quiescent condition.

If in the course of hunting by selector W its test relay P is connected over test switch arm c to check point PP of switching unit U, a test and seizing circuit is completed which includes coils I and II of test relay P, resistors R6, R7 and R9 and the parallel circuit of both transistors T1 and T2, still another resistor R8 being connected in series with transistor T2. The voltage drop across resistor R7 is recognized by a comparator V which until then sent a +1 volt output signal via its output v to common control G and now sends a −11V output signal via its output v. In this way the seizure of switching unit U is signaled to common control G via circuit z1. In addition, comparator V reacts to the voltage drop across resistor R7 with a delay which is sufficiently large to ignore short duration noise pulses.

Due to the output signal of −11V, from output v of comparator V current flows through resistors R10, R5 and R4. This current flow turns on transistor T5 as described below.

Test relay P of selector W connected to check point PP is also energized by the completion of the test and seizing as described above. Test relay P then closes its contact 1p, which short-circuits high-impedance coil II and continues to energize low impedance coil I. Thus, a relatively low-impedance ground potential is now applied via this contact 1p and coil I at check point PP of switching unit U. In this way, further selectors are prevented from testing this seized switching unit U for the idle condition because this seized switching unit U is already blocked due to the pickup of test relay P. The current flow through resistor R7 now increases due to the drop-out of coil II of test relay P which results in the rise of the voltage drop across resistor R7. However, this increased current flow does not affect comparator V.

About 40 milliseconds after comparator V recognizes the voltage drop across resistor R7 and signals via its output v and circuit z1 the seizure of switching unit U to common control G, the common control G disconnects the negative potential which former was applied to transistor T3 via circuit z2. As a result, the 5-volt positive potential connected to resistor R1 turns off the transistor T3. Consequently, the transistors T1 and T2 are also turned off. However, the transistor T4 now conducts current due to the 5-volt positive potential across resistor R1. Upon turning on, transistor T4 connects ground potential to the node between the two resistors R4 and R5. As a result, a negative potential appears at the node between the two resistors R5 and R10 which is sufficient to turn on transistor T5. In this way, the voltage divider formed by resistors R11 and R12 conducts current and generates a negative potential at the voltage-divider midpoint which is sufficient to turn on transistor T6. The current initially flowing through resistor R7 to transistors T1 and T2 now no longer runs through these transistors. The current path is switched over from transistors T1 and T2 to the resistors R13 and R14 which are connected to the −60V potential through turned on transistor T6. Capacitors C1 and C2 are provided so that in the last-mentioned process the transistors T1 and T2 continue conducting current for a given time period after the transistor T3 is turned off. In this manner, the above-described seizure current initially running through resistor R9 is not interrupted until the seizing and holding circuit including resistors R13 and R14 and transistor T6 is actuated. Thus, no interruption in current flow occurs in the test and seizing circuit connected to check point PP.

Due to this switchover of the test and seizing circuit connected to check point PP from the circuit running through transistors T1 and T2 to the circuit running through transistor T6, the total resistance between check point PP and the −60V potential is increased. Through this switchover process of the seizing circuit the blocking protection of switching unit U is increased, that is to say, the protection that no other selector may test and seize the switching unit U.

Due to the above described switchover of the seizing circuit from the circuit ultimately running through resistor R9 to the circuit running through resistors R13 and R14, the voltage drop applied to comparator V across resistors R7 and R13 is increased. In this way, the test and seizing circuit is protected throughout the duration of the corresponding switched connection from induced or capacitively transmitted extraneous voltages. Moreover, the blocking protection against double testing by another selector is increased while at the same time the current consumption of the seizing circuit is decreased.

After the test and seizing circuit is disconnected from the preceding selector, that is, if the corresponding connection is released, the resistors R7 and R13 have no load. In response to the absence of a voltage drop across these resistors, the comparator V again disconnects the −11 volt signal sent until then via its output v and instead applies the +1V potential mentioned earlier. Thus, the comparator V signals via circuit z1 the common control G that the switching unit U has been released from the preceding selector. The common control G now causes in a manner not described in detail herein the release of all other parts of the switching unit U. The common control G temporarily does not provide the above mentioned negative potential over circuit z2.

Due to the change of the output signal of comparator V from −11 volts to +1 volt, the transistor T5 is again nonconducting and, hence, transistor T6 is also turned off. Now, if a selector tests the switching unit U while switching unit U is still in the circuit condition of an incompletely processed release, the selector will not detect the −60 volt potential which normally identifies an idle condition either through transistors T1 and T2 or through transistors T6. The switching unit U is thus temporarily blocked against renewed seizure.

As described earlier, during the release of switching unit U, i.e., during the opening of the test and seizing circuit, the comparator V again supplies the positive potential of about 1 volt instead of the negative potential of 11 volts. However, the comparator V reacts with a certain delay to the disappearance of the voltage drop across resistors R7 and R13. In this way, a false release cannot occur due to, for example, noise pulses which may be transmitted inductively or capacitively to the test and seizing circuit of a switched connection in the blocking state.

With regard to the problem of testing connections which are in the process of being released, there may be a case where a second testing selector simultaneously connects its test relay over its test switch arm to the check point of a switching unit seized and blocked by a first selector, but that immediately thereafter this other blocking or first selector releases and opens the previously closed test and seizing circuit. In such a case, in conventional switching systems, the possibility exists that the test relay of the second testing selector in question picks up, thereby establishing a false connection. To prevent this from happening, the comparator V is equipped on the input side with switching means which are capable of detecting a lowering of the voltage drop across resistors R7 and R13, e.g., a conventional voltage differentiator. In this regard it should be noted that the test and seizing circuit formed by this blocking or first selector, while in the blocking state, contains only the coil I of the test relay P. On the other hand, the test and seizing circuit formed by this second testing selector, which continues to test the test and seizing circuit during the blocking state, contains in addition to the low-impedance coil I the higher-impedance coil II of test relay P.

Thus, in the above example, the release of the first connection does not result in an opening of the test and seizing circuit, that is, in a complete disappearance of the voltage drop across resistors R7 and R13, but in a decrease of the current, that is, in a lowering of the voltage drop across these two resistors. After this current decrease, the voltage drop effective in the comparator in this particular case occurs across resistors R7 and R13, which therefore is even greater than the voltage drop effective for the normal test and seizing process prior to the pickup of the test relay concerned because this voltage drop occurs only across resistor R7. Now, in order to be able to differentiate this particular instance (checking for a releasing connection) from a normal test and seizing process of a switching unit U in the idle condition, it is not sufficient for the comparator V to measure the voltage drop on the input side only; in order to be able to clearly distinguish these two instances from one another the comparator V is equipped on the input side with switching means by which the time function of the input-side voltage, i.e., the lowering of the voltage drop across resistors R7 and R13, can be recognized. Thus, a test for releasing connections can be provided with assurance even for selectors in which no special provisions have been made for such a test.

As mentioned earlier, the seizing circuit of switching unit U runs from check point PP through resistors R6, R7, R8 and R9 and through transistors T1 and T2. On the other hand, during the operation of the higher impedance portion of the seizing circuit, the circuit comprising resistors R8 and R9 and transistors T1 and T2 is turned off and instead a holding circuit running through resistors R13 and R14 and transistor T6 is turned on. Great importance is attached to the portion of the seizing circuit containing resistors R8 and R9 and transistors T1 and T2. This part of the seizing circuit works together with the connection to the −60V power source as a constant-current source. To this end, the transistor T1 has a current-regulating function. The potential applied to the base of transistor T1 across transistor T3 and resistor R2, which is positive with respect to the −60V battery potential connected via resistor R9, is limited by the Zener diode D1 such that the absolute value of the base potential of transistor T1 cannot exceed a value defined by the Zener diode D1. The current energizing the seizing circuit produces a voltage drop across resistor R9. The Zener voltage of diode D1 minus this voltage drop across resistor R9 has a controlling influence on transistor T1 and determines its base current. Thus, since the base potential across the transistor T1, assuming T1 is turned on, must be positive and remain so with respect to its emitter potential, the voltage drop across resistor R9 is limited. This voltage drop can attain at the very most a value corresponding to the Zener voltage reduced by the control value (VBE) required for transistor T1. Thus, since the voltage drop across resistor R9 is limited, the current in the seizing circuit itself is likewise subject to a limit. Hence, transistor T1 has a current-regulating function. It simulates an adjustable resistance between zero ohms and an effectively infinitely large resistance.

Resistor R8 is connected in parallel with transistor T1 via transistor T2 which in this operating condition provides a low resistance path to current. The control range of the constant-current supply formed by the transistors T1 and T2 and the resistors R8 and R9 as well as the Zener diode D1 is determined by the resistance value of resistor R8. Thus, taking into account the effected resistance of transistor T1, the constant-current source is capable of regulating the current in the test and seizing circuit within limits determined by the current flow through resistor R8. Resistor R8 essentially diverts the current which flows between resistors R7 and R9 from the transistor T1 in order to limit the power dissipation in transistor T1. In this way, the maximum power dissipation in transistor T1 in a practical application can be reduced by a ratio of about 2 to 1 as a result of the provision of resistor R8 and transistor T2.

However, it is also possible to eliminate transistor T2 and resistor R8. In this way one enlarges the control range of transistor T1 but at the same time the power dissipation in transistor T1 is likewise increased.

The current-regulating action of the constant-current source will be described hereinbelow by comparing its operation during the routine test with its operation during a double or parallel test. Assuming that during the parallel test the two parallel-testing selectors are selectors with identical test circuits, then, as is well-known, the internal resistance value of the test circuits of the selectors in the parallel connection is half the internal resistance value of only one of the two test circuits. The constant-current source thus finds across point PP of the switching unit U in the parallel test only half the resistance found in the routine test. However, provision is made so that in both cases the same current energizes the seizing circuit of the switching unit U. Hence, in a parallel test only half as much current flows in the test relay of the selector as in the routine test. For this reason, the parallel test is clearly discernible from the routine test and this discrimination between these two tests increases the protection against double testing.

In this connection it is also worth noting that the test and seizing circuits each run along one of the wires of trunk lines which may have different lengths; this may produce a substantially larger line resistance in the relevant seizing circuit of a switching unit U. The line resistance of a trunk line must be visualized as inserted between resistor R6 of switching unit U and its check point PP. Another function of the constant-current source is to balance the line resistance of the seizing circuits which vary from trunk line to trunk line.

Furthermore, the constant-current source affords good earth-fault protection at check point PP of switching unit U. Thus, if a short circuit occurs, the constant-current source prevents resistors R6 and R7, which carry the short-circuit current, from being overloaded.

In addition to the function described hereinabove, i.e., to delay — upon the occurrence of the high impedance instruction of common control G — the disconnection of the branch of the seizing circuit extending through resistor R9, the capacitors C1 and C2 have the further task of providing a delayed current rise in the test and seizing circuit at the start of a test and seizing process. As is well known, test relays require seizing relays in seizing circuits that are accessible to them and whose windings exhibit a complex resistance that causes a delayed current rise at the start of each test and seizing process. To achieve the shortest possible response time in the test relay, the seizing relays normally carry a secondary winding which is short-circuited in the quiescent condition and, as a result, the current rise in a closed test and seizing circuit is steeper than if the short-circuited secondary winding were not provided. In this way, a comparatively short response time is achieved for the test relay. As is also well known, motorswitch circuits employ test relays which have exceedingly fast response characteristics in comparison to other electromechanical relays of known construction. These test relays are thus particularly sensitive. Thus, even if a winding of an electromagnetic seizing relay in the seizing circuit of a rear position switching unit ready for seizure is included in the response circuits of the test relays, these test relays are designed to rapidly stop the selector motor of the associated selector W. This occurs even though this seizing relay, despite its short-circuited secondary winding, results to a certain extent in a delayed current rise in the test and seizing circuit due to its own residual inductance. Now, if such highly sensitive and rapidly responding test relays of motor switches would test seizing circuits containing only purely ohmic resistances, the speed of response would be even further increased. One consequence would be contact bounce which would increase the wear of the test relay contacts, particularly those that directly serve to stop the motor and, thus, are subject to a particularly heavy current load. This undesired effect is eliminated by the switching arrangement designed in accordance with the principles of this invention in that at the start of each test and seizing process the current rise in transistor T1 is delayed by capacitor C1. In the idle condition there flows a quiescent current through transistor T3, resistor R2, base-emitter junction of transistor T1 and resistor R9, provided switching unit U is identified by common control G as ready for seizure (negative potential applied to the base of transistor T3 over circuit z2). Resistor R2 has a much higher resistance value than resistor R9. Hence thre is a relatively slight voltage drop across this resistor R9. Likewise, the voltage drop across the base-emitter junction of transistor T1 is very small. Hence, in the idle condition, capacitor C1 is charged up to about 1V only. Now, if a test and seizing circuit is completed, only a relatively weak current is initially generated owing to the above-described current-regulating action of transistor T1 in the test and seizing circuit. Since, as mentioned earlier, the current flowing in the seizing circuit causes a corresponding voltage drop across resistor R9 and, since this voltage drop is less than the capacitor voltage, that is, this voltage drop is equivalent to the voltage across capacitor C1 minus the control voltage (VBE) of transistor T1, the voltage across capacitor C1 determines the maximum current in the seizing circuit. Capacitor C1 is now charged via resistor R2. The control potential across transistor T1 rises in accordance with this charging process. Consequently, the current in the test and seizing circuit rises in concert. The charging process of capacitor C1 is terminated when the Zener voltage of diode D1 is attained. Thereafter, this voltage is maintained by the capacitor and the current in the seizing circuit ceases to rise. Upon actuation of the high impedance circuit in response to a high impedance instruction from common control G, that is, when transistor T3 and resistor R2 are without load, capacitor C1 is discharged via resistor R15.

Just as an RC network comprising the resistor R2 and the capacitor C1 is connected to transistor T1 for delaying the current rise in the emitter-collector junction of transistor T1, an RC network comprising the resistor R3 and the capacitor C2 is connected to transistor T2. Both RC networks have substantially the same design. However, resistor R8 is connected in series with the emitter-collector junction of transistor T2, it is essentially the transistor T1 that determines the delayed current rise in the test and seizing circuit.

If switching unit U should be blocked in the quiescent condition against renewed seizure by a first selector, the common control G disconnects the negative potential previously applied in the quiescent condition via circuit z2. This renders transistor T3 non-conductive. The base-emitter junctions of transistors T1 and T2 also become deenergized. As a result, no other selector can test the switching unit U which is blocked in the quiescent condition. Thus, switching unit U receives from common control G over one and the same circuit z2 both the switching instruction or signal "connect to high impedance" and the instruction or signal "blocking in quiescent condition". Both these signals which the common control G sends to switching unit U are discernible from one another because the common control G applies the negative voltage for the connection to high impedance after the seizure has taken place, while it applies the negative voltage for blocking when the seizing circuit is in the quiescent condition. However, both signals are transmitted to switching unit U over one and the same circuit z2.

In conclusion, with regard to the input-side switching means of the comparator V which differentiates the voltage in accordance with time, reference is made to West German Pat. No. 1 165 677 which is equivalent to U.S. Pat. No. 3,287,502, issued to Rohrig on Nov. 22, 1966. Although this prior switching arrangement relates to a test circuit, the switching means shown and described for differentiating the voltage in accordance with time may also be employed in the switching arrangement described in this application.

Further details of circuit V may also be found in our copending U.S. application Ser. No. 668,955 by Konig et al., filed on Mar. 22, 1976, having a priority date of Mar. 21, 1975 now U.S. Pat. No. 4,049,922 issued on Sept. 20, 1977.

What is claimed is:

1. In a switching arrangement for telecommunication switching systems, more particularly telephone switching systems, having test and seizing circuit means for testing the busy/idle condition of a switching unit, said test and seizing circuit means including power supply means, test circuit means connected to one terminal of said power supply means for testing the condition of said switching unit and seizing circuit means associated with said switching unit for seizing said switching unit in the event said switching unit is in the idle condition when said test circuit means tests said switching unit, said seizing circuit means being connected to said test circuit means and another terminal of said power supply means for defining a current path in said test and seizing circuit means, said test circuit means including test switching means such as a test relay for testing the condition of said switching unit, the improvement comprising:

current delay means in said seizing circuit means for delaying the increase in current in said current path in said test and seizing circuit means to eliminate contact bounce in said test switching means upon seizure of said switching unit, said current delay means comprising:

a transistor having its emitter-collector junction connected in said current path in said test and seizing circuit means for conducting the current in said current path;

control means connected to the base of said transistor for driving said transistor in the event said switching unit is in the idle condition;

a testing resistor connected to the emitter of said transistor for conducting the current in said current path, said testing resistor having a voltage drop which increases upon seizure of said switching unit; and a charging capacitor connected to the base of said transistor having a charging voltage responsive to the voltage drop across said testing resistor for delaying the increase in voltage on the base of said transistor to thereby render the emitter-collector junction and said current path increasingly conductive to current upon seizure of said switching unit.

2. The switching arrangement defined in claim 1 wherein said current delay means further comprises a charging resistor connected to the base of said transistor between said charging capacitor and said control means for conducting the current for charging said charging capacitor and driving said transistor.

3. The switching arrangement defined in claim 2 wherein the charging voltage of said charging capacitor is responsive to a shift of the potential on the base of said transistor.

4. The switching arrangement defined in claim 3, wherein said charging capacitor and said charging resistor form an RC network for controlling a rise in the potential on the base of said transistor, the current in said current path rising with a time delay determined by the time constant of the RC network.

5. The switching arrangement defined in claim 4, wherein said testing resistor connects the emitter of said transistor to a terminal of said power supply means whose potential indicates the idle condition of said switching unit, wherein said charging resistor in the RC network connects the base of said transistor with said control means which provides the necessary charging current to said charging capacitor.

6. The switching arrangement defined in claim 5, wherein said current delay means further comprises a voltage-dependent resistor connected to the base of said transistor and said terminal of said power supply means to set a voltage limit on the charging voltage of said charging capacitor, said voltage-dependent resistor preventing a further rise of the potential across the base of said transistor and, hence, a further rise of the current in said current path in said test and seizing circuit means.

7. The switching arrangement defined in claim 6, wherein said voltage-dependent resistor is a Zener diode.

* * * * *